April 24, 1934. J. V. O. PALM 1,956,469
BEARING MANUFACTURE
Filed Oct. 1, 1930
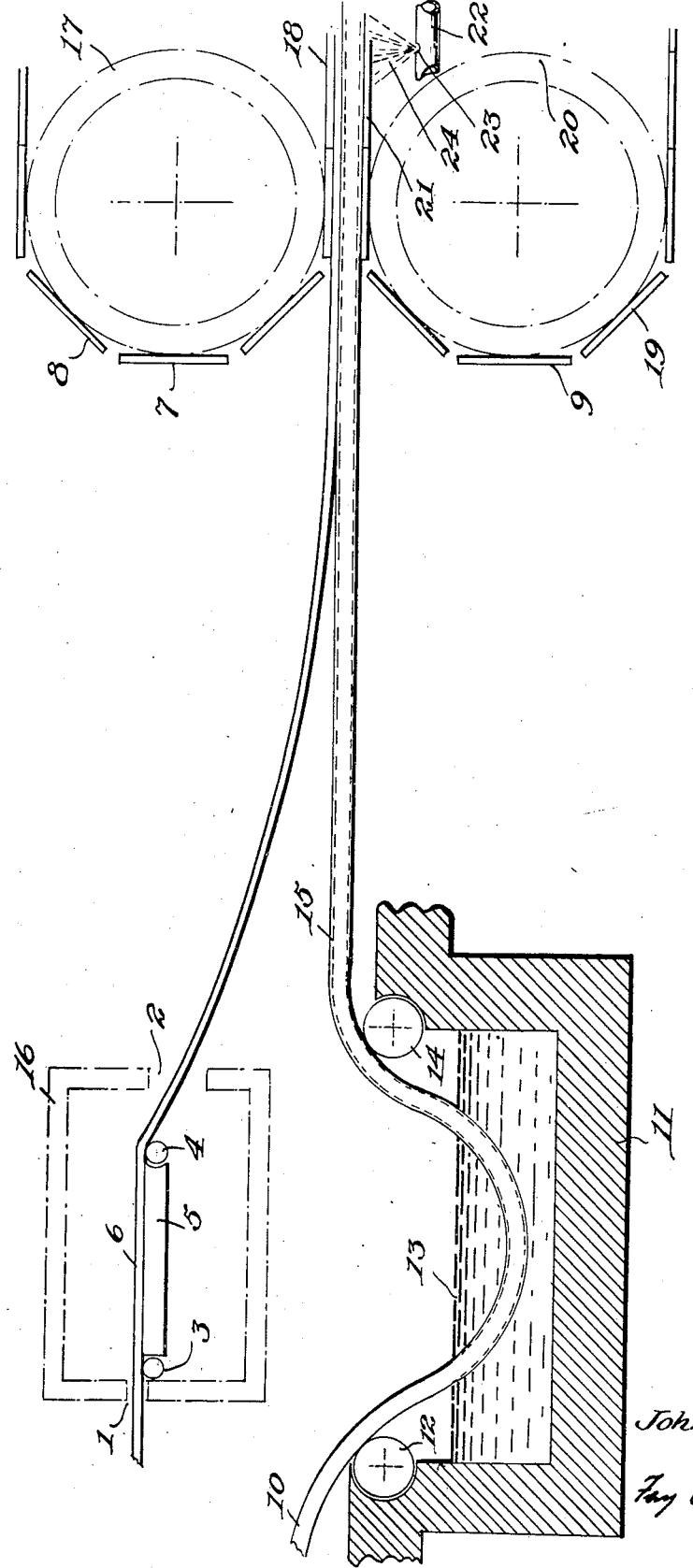
Inventor
John V. O. Palm
Fay Oberlin & Fay
Attorneys Patented Apr. 24, 1934

1,956,469

UNITED STATES PATENT OFFICE 1,956,469

BEARING MANUFACTURE

John V. O. Palm, Cleveland Heights, Ohio, assignor to The Cleveland Graphite Bronze Company, Cleveland, Ohio, a corporation of Ohio Application October 1, 1930, Serial No. 485,700

7 Claims. (Cl. 29—149.5)

This invention, relating, as indicated, to bearing manufacture is more particularly directed to a novel method of producing journal bearings, as distinguished from ball and roller bearings.

Ordinarily, the housings which receive bearings are castings and the bearing material which may be babbitt is poured against the housing, this process being quite costly because of the fact that the babbitt must be of considerable thickness, due to the irregularity of the cast housing surface, and also because the housings are sometimes of relatively large proportions, and placing them in a position to line with babbitt is an expensive and awkward process. The thick layer of babbitt in such bearings of the prior art is also objectionable because babbitt is soft and a thick layer is subject to distortion from radial pressure more easily than a thin lining of babbitt backed with hard material.

A second well known method, which has supplanted to a large extent the above mentioned pouring method, in the bearing industry is to line a thick layer of brass with babbitt, but the resulting bearing is very expensive because of the cost of the brass. It has been found that steel may be lined with babbitt or bronze, and that the thickness of the steel as compared with that of the brass may be materially reduced. The resulting bearing is very cheap to produce as far as the materials are concerned, but the problem is how to unite these two metals, which have such different properties, so that the cost of such union plus the cost of materials is less than the total cost of a lined housing or a lined brass backed bearing. I have found that either bronze, or babbitt, or other suitable bearing material in the form of strips may be united to steel, and that this thickness of the babbitt or equivalent bearing material may be materially reduced and yet such a bearing will outlast a thick, cast bearing, and in the event of replacement the cost is only a fraction of what it would be under former conditions.

A further and important objection to replacing worn out bearings by casting is that the process of casting, being carried out in small shops under all sorts of conditions, produces a bearing lining the structure of which is far from uniform as compared to a lining produced in the factory under controlled conditions, where the bearing has a structure of just the desired character. This will be appreciated by taking the main bearing of an automobile, for example, which is usually cast in the block. If this bearing becomes worn the block has to be taken out, all the old babbitt removed, and then the bearing housing is cast with babbitt. With the use of my improved thin wall bearings all of this labor is avoided and the cost of material is less, since part of the space which was formerly occupied by babbitt, a very expensive material, is now taken up by steel. The reference to the use of my bearing in an automobile is only intended as a means of illustration and I do not wish to be limited to the use of my improved bearing in automobiles.

The invention contemplated herein is the provision of a process which is continuous and in which a strip of steel is coated with solder and then united to a strip of babbitt in such a manner that a composite integral strip of bearing material results. The strip produced in this manner is positively bonded together so that the resulting material has all the desired characteristics of both the steel and the babbitt, whereas in the prior art difficulty has been encountered in bonding strips of such different properties together. The terms "babbitt", "steel" and "solder" are to be construed in a relative sense, and not as limiting me to these specific metals because obvious substitutes could be made, such as bronze for babbitt, etc.

The annexed drawing and the following description set forth in detail one method and certain mechanism embodying the invention, such disclosed method and means constituting, however, but one of various mechanical forms in which the principle of the invention may be used.

In said annexed drawing:—

The figure is a side elevation with parts in section.

Referring now to the drawing, a receptacle 11 is shown which contains solder 13 in a molten state, the edges of the receptacle having idle rollers 12 and 14 to provide free movement of a strip of steel. This strip of steel is shown at 10 and it passes over the roller 12, enters the solder bath 13 and thence out of the receptacle by means of the roller 14. Various means may be provided to insure immersion of the strip in the molten solder, for instance, a toothed wheel may engage the strip 10 on its upper surface mid-way between the rollers 12 and 14 and in a lower horizontal plane. The coating of solder which the strip receives is shown at 15 and no precautions need be taken to regulate the thickness of the solder 15 because any access thereof is recovered in the succeeding steps of the process. A heat chamber 16 is shown above the solder bath, said chamber having an entrance 1 and an exit 2, the interior thereof being provided with a support 5 and idle rollers 3 and 4. Thus, a structure is provided which enables the strip of babbitt 6 to travel freely as it is being heated. Immediately adjacent the solder bath and the heat chamber a pressure means is situated, the function of which is to force the strips together and thus unite them. This pressure means I have termed a pressure belt. Briefly, this pressure belt comprises a pair of upper sprockets, one of which is shown at 17 around which a belt revolves, said belt consisting of plates 7 and 8 which have depending pin connecting lugs (not shown) and it resembles somewhat in appearance the traction belt on a tractor. The upper belt is pressed downwardly under enormous pressure from a point adjacent the sprocket 17 to a point adjacent its coacting sprocket, while the lower belt receives such thrust along the same distance, said lower belt being supported upon closely positioned rollers. The lower belt is exactly the same in construction as the upper belt and consists of plates 9 and 19 which revolve about two sprockets, one of such sprockets being illustrated at 20. A cooling means is provided for chilling the metal after it has become bonded, said means consisting of a cooling fluid supply pipe 22 having a series of openings 23 therein from which a spray 24 of cooling fluid is emitted. The exact positioning of the cooling means is preferably mid-way between the sprockets rather than immediately adjacent the sprockets as shown, this being done in order to allow setting of the bond before attempting to cool it.

The manufacture of bearings, according to my improved process is as follows:—

A strip of steel 10 is lead into a receptacle containing molten solder whereby a coating of solder is obtained thereon. At the same time a strip of babbitt is heated to a temperature at which it will unite the solder heretofore mentioned. These operations preferably take place at the same time and in superposed relation so that as the babbitt is heated it may be lead down upon the solder on the steel, the solder at this stage becoming slightly plastic. The strips are then fed between coacting belts and pressed together under enormous pressure which causes them to unite and form one composite strip. After the formation of the bond the strip is cooled gradually, said gradual cooling being obtained by spraying the lower belt which requires the cooling action of the spray to be transmitted through the belt and then through the relatively thick layer of steel. After the composite strip emerges from the pressure belt it is blanked to the desired size and then formed into bearings.

From the above description it will be seen that I have evolved a method in which bearings are quickly and cheaply produced, and that the process is a continuous one so that labor costs usually involved in transferring bearings from one operation to the other are reduced to a minimum. It will also be apparent that no involved and expensive apparatus is necessary, such as must be present in the prior methods of centrifugal casting and die casting. As a further advantage, bearings produced by my improved process may be used to replace worn bearings, and in the event of such replacement the cost thereof is considerably less than casting would be.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of manufacturing bearings, the steps which consist in coating a strip of bearing backing metal with an adhesive, heating a strip of bearing facing metal, uniting said strips by means of passing them between a plurality of synchronously moving flat plates, cooling said strips while under pressure and then blanking the resulting composite strip and forming the blanks into bearings.

2. In a continuous process of manufacturing bearings, the steps which comprise simultaneously feeding a strip of bearing backing material through a solder bath, feeding a strip while under pressure of bearing facing material through a heat chamber, joining said two strips and pressing them together between a plurality of synchronously moving flat plates, cooling the resulting composite strip and then blanking and forming the blanks into bearings.

3. In a method of manufacturing bearings, the steps which consist in coating a strip of steel with an adhesive, heating another strip of soft high melting point metal at the same time, superimposing said last named strip upon said steel strip and pressing said strips together between two oppositely disposed plane surfaces to form a composite strip of bearing material.

4. In a method of manufacturing bearings, the steps which consist in passing a strip of steel through molten solder, heating another strip of soft high melting point metal at the same time, superimposing said last named strip upon said steel strip and pressing said strips together between a plurality of synchronously moving flat plates to form a composite strip of bearing material.

5. In a method of manufacturing bearings, the steps which consist in passing a strip of steel through solder, heating another strip of babbitt at the same time, superimposing said last named strip upon said steel strip and pressing said strips together between two oppositely disposed plane surfaces to form a composite strip of bearing material.

6. In a continuous method of manufacturing composite bearing metal strips, the steps of disposing a layer of bearing metal on a layer of backing metal, subjecting said metal layers to heat, and then passing them between two oppositely disposed pressure members having plane surfaces engaging said strip.

7. In a continuous method of manufacturing composite bearing metal strips, the steps of disposing a layer of bearing metal on a layer of backing metal, subjecting said metal layers to heat, then passing them between two oppositely disposed pressure members having plane surfaces, and then cooling the resulting composite strip while maintained between said surfaces engaging said strip.

JOHN V. O. PALM.